United States Patent [19]
Pitha et al.

[11] Patent Number: 5,096,893
[45] Date of Patent: Mar. 17, 1992

[54] REGIOSELECTIVE SUBSTITUTIONS IN CYCLODEXTRINS

[75] Inventors: Josef Pitha, Baltimore, Md.; Bengt Lindberg, Stockholm, Sweden

[73] Assignee: The United States of America as represented by the Department of Health and Human Services, Washington, D.C.

[21] Appl. No.: 633,402

[22] Filed: Dec. 17, 1990

Related U.S. Application Data

[63] Continuation of Ser. No. 332,606, Apr. 3, 1989, abandoned.

[51] Int. Cl.$^5$ .................. A61K 31/715; C08B 37/16
[52] U.S. Cl. ...................................... 514/58; 536/103; 514/936
[58] Field of Search .................. 536/103; 514/58, 936

[56] References Cited

U.S. PATENT DOCUMENTS

| | | | |
|---|---|---|---|
| 3,459,731 | 8/1969 | Gramera et al. | 536/103 |
| 4,582,900 | 4/1986 | Brandt et al. | 536/103 |
| 4,596,795 | 6/1986 | Pitha | 514/58 |
| 4,638,058 | 1/1987 | Brandt | 536/103 |
| 4,727,064 | 2/1988 | Pitha | 536/103 |
| 4,764,604 | 8/1988 | Müller | 536/103 |
| 4,877,778 | 10/1989 | Carpenter et al. | 536/103 |

*Primary Examiner*—Ronald W. Griffin

[57] ABSTRACT

A method for obtaining a desired pattern of substitution of hydroxyalkyl groups on cyclodextrins which comprises controlling the basicity of a reaction mixture comprising epoxide and cyclodextrins and a suitable solvent. Through the proper control of basicity with, e.g., sodium hydroxide, hydroxyalkyl substitution may be directed either toward the narrow or wide opening of the cavity of cyclodextrins.

17 Claims, 3 Drawing Sheets

REGIOSELECTIVE SUBSTITUTIONS IN CYCLODEXTRINS

This application is a continuation of application Ser. No. 07/332,606 filed on Apr. 3, 1989, now abandoned.

This invention relates to derivatives of cyclodextrines.

The development of procedures which would yield mixtures of cyclodextrin derivatives in which substitution at either the wide or narrow side of the toroid would be predominant was desired. Such a specific pattern of substitution has not been thought to be realizable by simple means, i.e., using cheap reagents without fractionation of the product. Nevertheless, that has been accomplished and here we disclose that by proper selection of preparative conditions mixtures of cyclodextrin derivatives with a specific pattern of substitution can be obtained. That discovery was made possible through a detailed analysis of cyclodextrin mixtures. That analysis, in conjunction with a fortuitous choice of reaction conditions, is the basis of the present invention. It should be noted that reagents and reaction conditions similar to those previously used by us and others have been employed. The novelty is the finding that there exist regions of reaction conditions which previously were not used and in which mixtures of cyclodextrin derivatives with unique substitution patterns are obtained; furthermore, these patterns are only slightly affected by the overall degree of substitution. That finding may be of importance since on its basis mixtures of cyclodextrin derivatives can be tailored for uses where recognition of a specific guest compound by a host is desired.

BACKGROUND OF THE INVENTION

The usefulness of those derivatives of polysaccharides which assume random coil conformation depends primarily on their average degree of substitution and is only slightly affected by the differences in substitution patterns. Polysaccharide derivatives with an ordered conformation and derivatives of cyclic oligosaccharides (e.g., $\alpha$-, $\beta$-, or $\gamma$-cyclodextrins, see FIGS. 1-3), which are de facto ordered by the presence of a cycle, present a different problem; there the substitution pattern may profoundly affect their usefulness. The shape of cyclodextrins is a toroid: on the narrower side of the toroids (due to the perspective distortion the outside of macrocycles in FIGS. 1-3) are located all primary hydroxyls and on the wider sides are the secondary hydroxyls. Thus, substitution on secondary hydroxyls puts the substituents close to the wider entry of the cavity of the toroid, whereas substitutions on the primary hydroxyls are close to the narrower entry. The principal use of cyclodextrins is in inclusion complexation: a guest lipophilic compound is accepted into the toroidal cavity of the host compound, i.e., of the cyclodextrin. This process is bound to be affected by specific changes at the entry sites of the host molecule. That was well demonstrated using chemically pure cyclodextrin derivatives. These compounds were prepared by multi-step synthesis requiring multiple extensive purifications and thus are available only in small quantities and at a great price. In many applications the chemical purity (individuality) of cyclodextrin derivatives is not required or may even be of a detriment. Using mixtures of cyclodextrins is often preferred since these usually do not crystallize and thus have much higher solubilities and are also better suited as coatings.

Cyclodextrins, of structures depicted in FIGS. 1-3 similarly to other carbohydrates, react with epoxides yielding mixtures of oligosubstituted hydroxyalkylcyclodextrins. The latter compounds were first disclosed in a patent (Gramera and Caimi, Cyclodextrin Polyethers and Their Production, U.S. Pat. No. 3,459,731, Aug. 5, 1969); alkali catalyzed heterogenous reaction in pressure vessel was used in that work. Later these mixtures were prepared by reaction of epoxides with cyclodextrins in a homogenous reaction in aqueous alkali and the products found eminently useful for pharmaceutical purposes and this use was protected with patents (Pitha, Administration of Sex Hormones in the Form of Hydrophilic Cyclodextrin Derivatives, U.S. Pat. No. 4,596,795, June 24, 1986; Pitha, Pharmaceutical Preparations Containing Cyclodextrin Derivatives, U.S. Pat. No. 4,727,064, Feb. 23, 1988; B. W. W. Muller and U. Brauns, Eur. Patent Appl. No. 115,965, 1983; B. W. W. Muller, Derivatives of gamma-cyclodextrin, U.S. Pat. No. 4,764,604, Aug. 16, 1988 and comp. European patent application 86200334.0; B. W. W. Muller and U. Brauns, *Int. J. Pharm.* 26, 77, 1985; B. W. W. Muller and U. Brauns, *J. Pharm. Res.* 309, 1985; B. W. W. Muller and U. Brauns, *J. Pharm. Sci.* 75, 571, 1986). Hydroxyalkylcyclodextrins were also prepared by reaction of cyclodextrins with ethylene or propylene carbonate catalyzed by potassium carbonate (R. B. Friedman, Modified Cyclodextrins, abstract B6 of the 4th International Symposium on Cyclodextrins, April 1988, Munich, West Germany and German DE 3712246. Furthermore, preparation of mixed alkyl and hydroxyalkylcyclodextrins was the subject of two patent applications (L. Brandt and U. H. Felcht, Eur. Patent Appl. EP146,841 and EP147,685, which correspond to U.S. Pat. Nos. 4,582,900 and 4,638,058). The '900 and '058 patents do not contain any data on distribution of the substituents. The multicomponent mixtures of hydroxyalkylcyclodextrins could be characterized using mass spectrometry, as far as number of substituents per cyclodextrin is concerned-see FIGS. 4-5. Each of the peaks in such a spectrum corresponds to a certain degree of substitution, but since there is a great number of possible isomeric compounds at any degree of substitution, the mixtures are only partially characterized by direct mass spectrometry. An advance in characterization was obtained by hydrolysis of hydroxypropylcyclodextrin mixtures and evaluation of the hydroxypropylglucose mixtures thus obtained by mass spectrometry (T. Irie, K. Fukunaga, A. Yoshida, K. Uekama, H. M. Fales, and J. Pitha, *Pharmaceut. Res.* 5, 713-717, 1988). These results show that the substituents in hydroxypropylcyclodextrins are not evenly distributed between the glucose residues. A large number of hydroxyalkylcyclodextrins has been prepared and characterized in this manner and the average degree of substitution was found to depend primarily on the ratio of reagents used. These quite diverse reaction conditions yielded mixtures with a rather similar distribution of degree of substitution (Pitha et al., *Int. J. Pharm.* 29: 73-82, 1986; Irie et al., *Pharmaceut. Res.* 5: 713-717, 1988). Consequently, the reaction conditions (i.e., strength of alkali added) were chosen primarily on the basis of convenience of manipulation of the mixtures. In different protocols (Pitha et al., *Int. J. Pharm.* 29: 73-82, 1986; Irie et al., *Pharmaceut. Res.* 5: 713-717, 1988) the concentration of sodium hydroxide solution, which is used as a solvent for the other component, ranged between 5-17% W/W. At concentrations lower than these the reaction proceeds sluggishly; at higher concentrations the solubility of α-cyclodextrin decreases and also the removal of sodium hydroxide after the reaction becomes tedious. In production of hydroxyalkylcyclodextrins the practical range of the concentrations of sodium hydroxide solution used as a solvent were 5-17% and there was no incentive to venture outside of this range.

DETAILED DESCRIPTION OF THE INVENTION

Herein we disclose the use of controlled basic reaction conditions to provide directed substitution at specific sites: (1) toward hydroxyls 2 or 2,3 of glucose residues with little substitution or (2) toward hydroxyls 6 and 2 with the former strongly predominating.

Samples of hydroxpropylated β-cyclodextrin were prepared by reacting β-cyclodextrin with propylene oxide in aqueous sodium hydroxide (Examples 1-7). The reaction conditions used in these preparations are summarized in Table 1. In the preparation described in Example 8 anhydrous conditions were used with sodium methylsulfinylmethanide in dimethylsulfoxide as catalyst and solvent, respectively. In order to determine the distribution of substituents between the different positions in the α-D-glucopyranosyl residues of β-cyclodextrin each product was permethylated (Example 9), hydrolysed, and the resulting glucose ethers reduced, acetylated, and analyzed as alditol acetates, by gas liquid chromatography (Example 10).

There are several points to be clarified before the results are evaluated. Etherification with propylene oxide is a complicated reaction. When racemic propylene oxide is used, diastereomeric ethers are formed, which are only partially separated by the analytical method used. In order to fully address this complication three samples (Examples 1-3) were prepared using racemic propylene oxide, whereas in Examples 4-8 (S)-propylene oxide was used, which is bound to yield a simpler pattern. Another complication is that the oxiran ring in propylene oxide can be opened either by attack on C-1, which is the predominating reaction and gives a 2-hydroxypropyl ether, or on 0-2, giving a 2-(1-hydroxypropyl) ether. Two derivatives of the latter type were observed in the present study. The third type of complication is due to the introduction of additional hydroxyls by the substituent. Fortunately, the secondary hydroxyl of the 2-hydroxypropyl group should not be very reactive, and alkylation in this position should consequently not be very important. Nevertheless, small amounts of such derivatives were observed.

The results of the analyses are summarized in Table 2. Conventional abbreviations were used—e.g., $S_2$ denotes mono-substitution on 0-2, $S_{226}$ denotes bi-substitution on 0-2 (by —$CH_2$—($CH_3$)—CH—O—$CH_2$—CH—($OCH_3$)—$CH_3$ group) and mono-substitution on 0-6; glucose-derived numbering was used for alditols. In some analyses undermethylation, especially in the 3-position, was observed. The products, however, were identified from their mass spectra, and the molar percentages added to those of the corresponding fully methylated components. Two 2-(1-methoxypropyl) ethers were observed with this group in the 2- and the 6-position of a glucosyl residue, respectively. The yields of these ethers were 2-4% of the corresponding 1-(2-methoxypropyl) ethers, and reflects the relative reactivities at the primary and the secondary position of propylene oxide, respectively.

The relative reactivities at the three different positions in the α-D-glucopyranosyl groups may be determined from the molar percentages of the ethers. Sperlin equations (H. M. Sperlin in E. Ott, H. M. Sperlin and M. W. Grafflin (Eds.) Cellulose and Cellulose Derivatives, Part II, Interscience, New York, 1954, pp. 673-712) were used to determine the relative reactivities, $k_2$, $k_3$, and $k_6$, from the distribution of the substituents. The results in Table II can thus be reduced to those three parameters (Table III). The value for $k_3$ there concerns the relative reactivity at 0-3 when 0-2 is not alkylated. Further calculations indicate that the reactivity at 0-3 is considerably enhanced when 0-2 becomes alkylated, but the values are inaccurate and are not reported. The reactivity at the hydroxyl groups introduced on 2-hydroxypropylation is low and has not been calculated.

From the results given in Table 3 it is evident that the relative reactivities at 0-2 and 0-3 are rather independent of the alkali concentration during the etherification. The relative reactivity of 0-6 versus 0-2, however, varies from approximately 1:5 at low alkali concentration to 7:1 at high alkali concentration. For the reaction promoted by sodium methylsulfinylmethanide in dimethyl sulfoxide, the alkylation in the 6-position is even more favored. These drastic changes in the reactivity of 0-6 are the basis for the regiospecificity observed at extremely low or high alkali concentrations, a phenomenon which is the subject of the present invention.

EXAMPLE 1

Preparation of Hydroxypropyl-β-cyclodextrin

Figure 1:
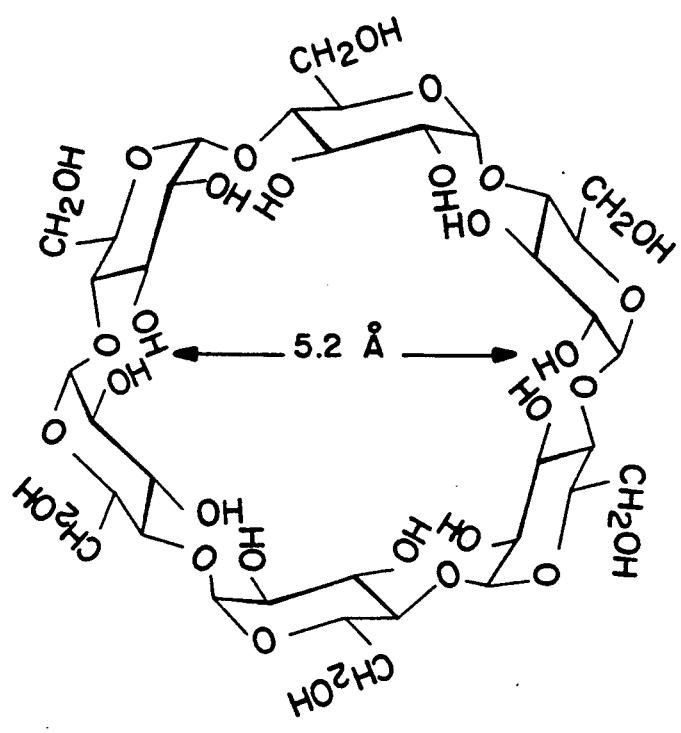
FIGS. 1, 2 and 3 depict the structure of α-, β- and γ-cyclodextrin, respectively. The inside of the macrocycles is the non-polar cavity into which the quest compound enters. In the projection used in these Figures the wider opening/side of the cavity is represented by the inside part of the macrocycle.
Figure 2:
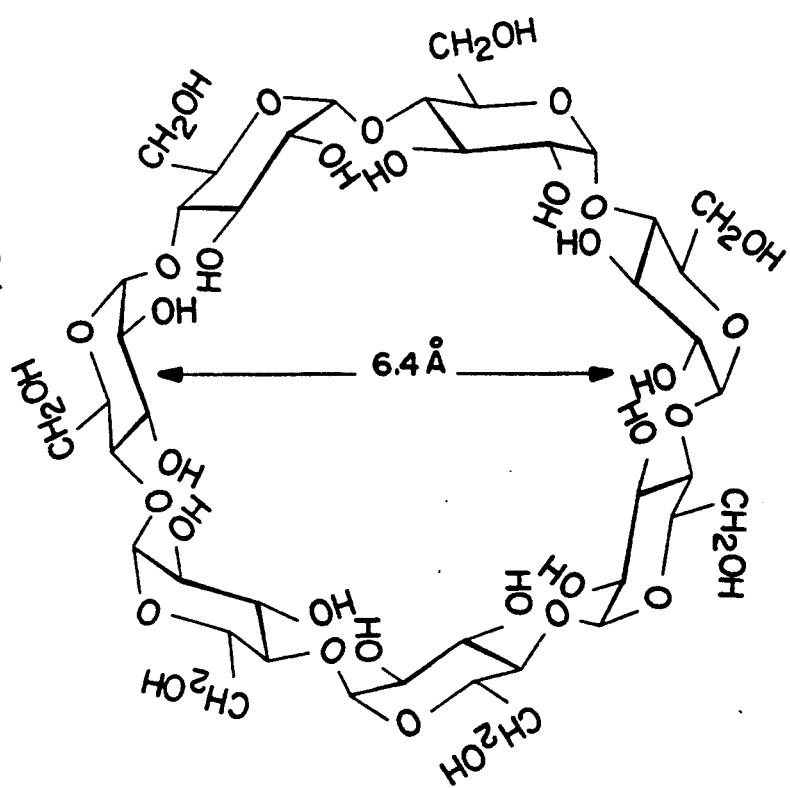
Figure 3:
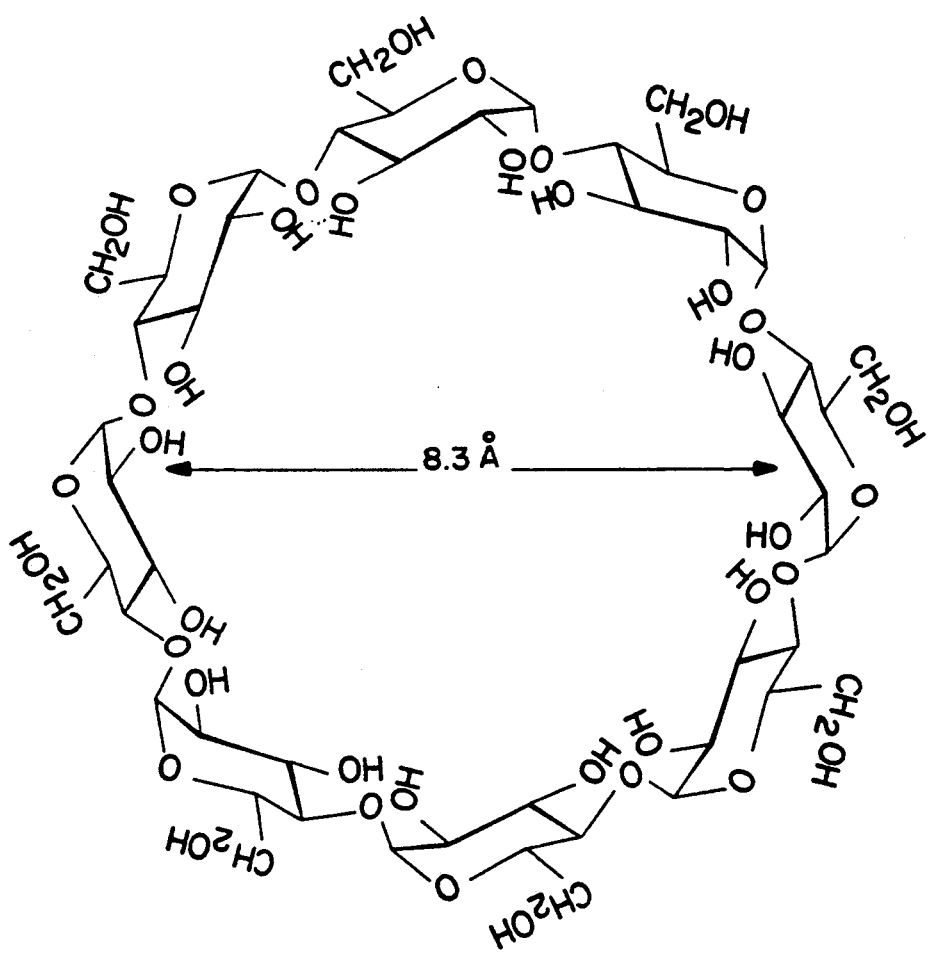
Figure 4:
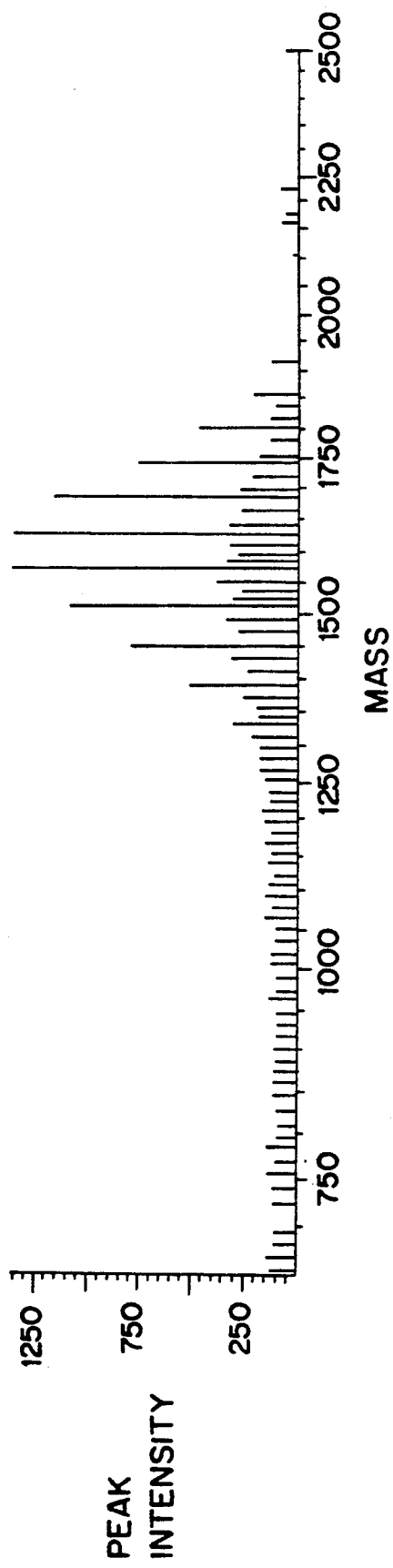
FIGS. 4 and 5 show the mass spectrum of a hydroxypropyl-β-cyclodextrin mixture.
Figure 5:
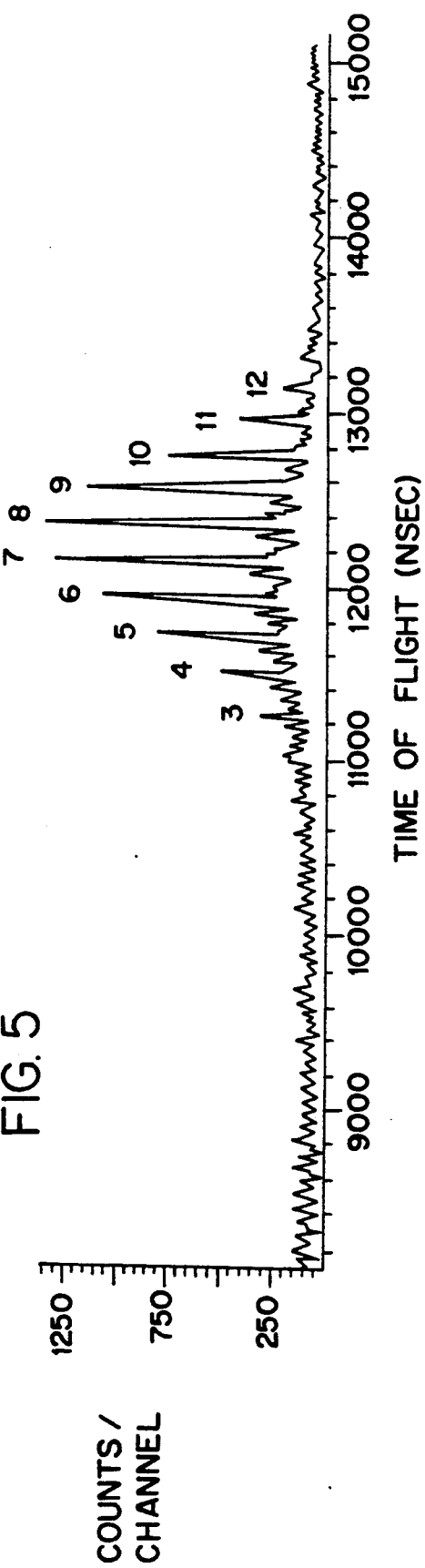

β-Cyclodextrin (200 g of hydrate corresponding to 173.2 g anhydrous and 0.153 mole) was dissolved with stirring in warm (60° C.) solution of sodium hydroxide (61.2 g or 0.53 mole in 300 ml of distilled water, i.e., 16.9% W/W). The solution was placed into round flask, cooled to ice bath temperature and after attachment of reflux condenser containing dry ice-acetone mixture, propylene oxide (25 ml, 23.2 g, 0.40 mole) was added dropwise with constant stirring. Stirring was continued for 3 hrs at ice bath temperature and overnight at room temperature. Then the mixture was neutralized with concentrated hydrochloric acid and evaporated in vacuo to a consistency of thick syrup, which was added to 1 L of ethanol (190 proof). After several hours of stirring the insoluble sodium chloride was filtered off, washed with ethanol (190 proof, 200 mL). The ethanolic solutions were evaporated in vacuo, residue dissolved in distilled water (300 mL) and dialyzed for 5 hrs at 0° C. against several charges of distilled water. The retained fraction was freeze-dried and the resulting powder stirred with acetone (1.5 L) for one day. The acetone was decanted and residue stirred with additional acetone (1 L) again for one day and the precipitate of hydroxypropyl-β-cyclodextrin filtered off and dried for 2 hrs in vacuo. Acetone solutions upon evaporation yielded oily residue (3 g) principally oligopropyleneglycols. The dried powder of hydroxypropyl-β-cyclodextrin was dissolved in distilled water (300 mL) and the solution freeze-dried to yield a white powder (98 g).

EXAMPLE 2

Preparation of Hydroxypropyl-β-cyclodextrin

β-Cyclodextrin (200 g hydrate, i.e., 173 g anhydrous, 0.153 mole) was, as above, dissolved in a solution of sodium hydroxide (85 g, 2.12 mole in 400 mL distilled water, i.e., 17.5% W/W) and in the same manner as above treated with propylene oxide (150 mL, 125 g, 2.152 mole). Using processing analogous to that above a fraction of oligopropylene glycols amounted to 38 g while altogether 193 g of hydroxypropyl-β-cyclodextrin was obtained.

EXAMPLE 3

Preparation of Hydroxypropyl-β-cyclodextrin

β-Cyclodextrin (500 g hydrate, i.e., 432 g anhydous, 0.382 mole) was as above dissolved in a solution of sodium hydroxide (45 g, 1.1 mole in 750 mL distilled water, i.e., 5.7% W/W) and under the same conditions as above treated with propylene oxide (260 mL, 217 g, 3.73 mole). The reaction mixture was left for five hours in an ice bath and kept at room temperature for two days. After processing similar to that described above and including extraction of oligopropylene glycols with acetone a white powder of hydroxypropyl-β-cyclodextrin (490 g) was obtained.

EXAMPLE 4

Preparation of (S)-Hydroxypropyl-β-cyclodextrin

β-Cyclodextrin (13.3 g of hydrate, i.e., 11.5 g anhydrous, 0.010 mole) was dissolved in a solution of sodium hydroxide (0.822 g, 0.0206 mol in 54 mL distilled water, i.e., 1.5%) by stirring at 60° C. The increased amount of alkaline solution used was necessitated by the low solubility of β-cyclodextrin at very low (present case) or very high (30%) concentration of sodium hydroxide. The solution was cooled in an ice bath and in the same manner as above (S)-propylene oxide (10 mL, 8.29 g, 0.143 mole), a commercial preparation obtained from Aldrich Chemical Co., was added. Reaction mixture was kept overnight at 0°-5° C. and thereafter for 4 hrs at room temperature. Then the mixture was neutralized with sulfuric acid (10%) to pH 7.5 and evaporated to dryness. Since the product is not well soluble either in ethanol or in water the residue, after evaporation, was suspended in distilled water (100 mL) and dialyzed against distilled water for 5 hrs at room temperature. The retained suspension was evaporated to dryness, yielding a white powdery product (14.23 g).

EXAMPLE 5

Preparation of (S)-Hydroxypropyl-β-cyclodextrin

β-Cyclodextrin (13.3 g of hydrate, i.e., 11.5 g anhydrous, 0.010 moles) was dissolved in a process as described above in a solution of sodium hydroxide (1.35 g, 0.034 moles in 27 mL distilled water, i.e., 4.8%) and treated in the manner described above with (S)-propylene oxide (10 mL, 8.29 g, 0.143 moles). The reaction mixture was kept overnight at 0°-5° C. and thereafter for 3 hrs at room temperature. After neutralization with diluted sulfuric acid (10%) the solution was evaporated in vacuo nearly to dryness and residue stirred with ethanol (100 mL, 190 proof) for 30 min. After filtering off the insoluble sodium sulfate the ethanolic extracts were evaporated to dryness, dissolved in distilled water (35 mL), and dialyzed against distilled water for 3 hrs at 0° C. Evaporation of the retained material yielded a white powder of (S)-hydroxypropyl-β-cyclodextrin (17.3 g).

EXAMPLE 6

Preparation of (S)-Hydroxypropyl-β-cyclodextrin

β-Cyclodextrin (13.3 g hydrate, i.e., 11.5 g anhydrous, 0.010 moles) was dissolved as above in the solution of sodium hydroxide (5.53 g, 0.13? moles in 27 mL distilled water, i.e., 17.0%) and treated in the manner described above with (S)-propylene oxide (10 mL, 8.29 g, 0.143 moles). The same isolation procedure as above yielded a white powder of (S)-2-hydroxypropyl-β-cyclodextrin (17.9 g).

EXAMPLE 7

Preparation of (S)-Hydroxypropyl-β-cyclodextrin

β-Cyclodextrin (8.02 g hydrate, 6.93 g anhydrous, 6.1 mmoles) was added to a solution of sodium hydroxide (13.955 g, 0.349 moles in water 32.6 mL, i.e., 30%) and dissolved by stirring and heating to 70° C. to a clear yellowish solution. Then the mixture was cooled in an ice bath and to the solution which remained homogenous was added, while stirring, (S)-propylene oxide (5 g, 0.086 moles). After neutralization, evaporation, ethanol extraction, and dialysis all performed as above, a white powdery product (9.22 g) was obtained.

EXAMPLE 8

One pot Preparation of Permethyl (S)-Hydroxypropyl-β-cyclodextrin

Sodium hydride (5.51 g of 80% dispersion in mineral oil, i.e., 0.31 mole) was added to anhydrous dimethyl sulfoxide (65 mL) and left to react at 60° C. with stirring under argon for 1 hr. Then anhydrous β-cyclodextrin (10 g, 0.0088 mole) dissolved in anhydrous dimethyl sulfoxide (65 mL) was added, stirred for 3 hrs at room temperature and to this solution then slowly added a solution of (S)-propylene oxide (2.05 g, 0.035 mole) in dimethyl sulfoxide (10 mL). The reaction mixture was stirred for 15 hrs at room temperature. Thereafter, methyl iodide (26 mL) was added dropwise (ice bath cooling) and the mixture stirred for one day at room temperature. After decomposition with water (100 mL) the product was extracted with chloroform (2×150 mL). Chloroform extracts were washed with water (100 mL), saturated sodium chloride, and evaporated. The residue was partitioned between water (25 mL) and diethyl ether (2×100 mL). Ethereal extracts were washed with water (20 mL), dried with anhydrous sodium sulfate, filtered through aluminum oxide (8 g), and evaporated to yield a product in the form of a pale yellow syrup (10.2 g).

EXAMPLE 9

Permethylation of Hydroxypropyl-β-cyclodextrins

All the procedures used were similar to the following: sodium hydride (2.1 g, as above, i.e., 0.07 moles) was added to anhydrous dimethyl sulfoxide (20 mL) under argon and the mixture heated for 1 hr to about 60°

C. Thereafter, well dried (3 hrs, 110° C.) hydroxypropyl-β-cyclodextrin (4 g) dissolved in dimethyl sulfoxide (15 mL) was added and left to react, under argon and while stirring at room temperature, for an additional 3 hrs. Then the reaction mixture was cooled in an ice bath and methyl iodide (10 mL, 0.161 moles) added dropwise. After another hour at ice bath temperature the mixture was left stirring overnight. Then water (24 mL) was added while cooling and the product extracted twice by chloroform (total 90 mL). The chloroform extract was washed with water (20 mL) and evaporated. The residue was treated with water (25 mL) and three times extracted with ether (total 75 mL), ether extracts washed with water, and evaporated. The residue was dissolved in ether (100 mL), stirred for 30 min with neutral alumina, filtered, and evaporated yielding 3.7 g of permethylated product.

EXAMPLE 10

Analysis of Permethyl Derivatives of Hydroxypropyl-β-cyclodextrins

The permethylated product (3 mg) was dissolved in M aqueous trifluoroacetic acid (0.5 mL), kept in a screw-cap tube at 100° C. overnight and concentrated by flushing with air. The residue and sodium borohydride (10 mg) were dissolved in M aqueous ammonia (0.5 mL) and kept at room temperature for 1 h. The solution was acidified with 50% acetic acid (2 drops) and concentrated. Boric acid was removed by codistillation first with acetic acid-methanol (1:9, 5 mL) and then with methanol (25 mL). The residue was treated with acetic anhydride and pyridine (2:1, 0.5 mL) at 100° C. for 30 min, concentrated, and partitioned between chloroform and water (2:1, 6 mL). The chloroform phase was concentrated and the residue analysed by g.l.c. and g.l.c.-m.s.

G.l.c. was performed on a Hewlett Packard 5830 A instrument fitted with a flame ionization detector, with hydrogen as the carrier gas. G.l.c.-m.s. was performed on a Hewlett Packard 5790-5970 system with helium as the carrier gas. A Hewlett Packard Ultra 2 (cross-linked 5% phenyl methyl silicone) fused silica, capillary column (25 m, 0.20 mm i.d.) was used. Temperature program: 8 min at 185° C.,→250° C. at 5° per min, 250° C. for 10 min.

TABLE 2

Composition of Alditol Acetates in Mole % Obtained from various 2-Hydroxypropyl-β-cyclodextrin Preparations

| Substitution pattern by 2-methoxy-propyl groups | Examples | | | | | | | |
|---|---|---|---|---|---|---|---|---|
| | 1 | 2 | 3 | 4 | 5 | 6 | 7 | 8 |
| $S_0$ | 77.8 | 43.9 | 39.3 | 74.4 | 40.2 | 42.9 | 53.2 | 65.5 |
| $S_0$ non-methylated on 0–3 | — | — | — | — | 2.8 | 2.2 | — | — |
| Total non-substituted | 77.8 | 43.9 | 39.3 | 74.4 | 43.0 | 45.1 | 53.2 | 65.5 |
| $S_2$ | 5.2 | 10.9 | 30.3 | 14.6 | 23.0 | 8.4 | 3.1 | 2.3 |
| $S_2$ non-methylated on 0–3 | — | — | — | — | 0.6 | 0.2 | — | — |
| $S_2$ 2-(1-methoxypropyl)- | — | — | — | — | 0.6 | — | — | — |
| $S_3$ | 2.7 | 5.2 | 5.4 | 4.8 | 6.1 | 3.0 | 1.4 | 0.9 |
| $S_3$ non-methylated on 0.6 | — | — | — | — | 0.5 | — | — | — |
| $S_6$ | 12.5 | 23.6 | 3.8 | 2.6 | 7.0 | 26.4 | 33.0 | 23.3 |
| $S_6$ non-methylated on 0–3 | — | — | — | — | 0.5 | 1.5 | — | — |
| $S_6$ 2-(1-methoxypropyl)- | — | — | — | — | — | 0.6 | — | — |
| Total monosubstituted | 20.4 | 39.7 | 39.5 | 22.0 | 38.3 | 40.1 | 37.5 | 36.5 |
| $S_{23}$ | 0.6 | 3.9 | 14.3 | 2.2 | 8.9 | 2.8 | 0.7 | — |
| $S_{26}$ | 0.9 | 7.5 | 3.7 | 0.9 | 5.2 | 6.4 | 1.9 | 1.8 |
| $S_{26}$ non-methylated on 0.3 | — | — | — | — | 0.7 | — | — | — |
| $S_{36}$ | 0.3 | 2.3 | 1.4 | 0.5 | 1.6 | 2.2 | 0.9 | — |
| $S_{66}$ | — | — | — | — | — | 0.3 | 4.7 | 6.0 |
| Total disubstituted | 1.8 | 13.7 | 19.4 | 3.6 | 16.4 | 11.7 | 8.2 | 7.8 |
| $S_{226}$ | — | — | — | — | — | 0.2 | 0.2 | — |
| $S_{236}$ | 0.1 | 2.7 | 1.7 | — | 2.4 | 2.3 | 0.7 | — |
| $S_{266}$ | — | — | — | — | — | — | 0.5 | 0.4 | 
| $S_{666}$ | — | — | — | — | — | — | — | 0.2 | 
| Total trisubstituted | 0.1 | 2.7 | 1.7 | 0 | 2.4 | 3.0 | 1.5 | 0 |

TABLE 3

Relative Reactivities at the 2,3- and 6-Positions and Average Degree of Substitution Values for the Different 2-Hydroxypropyl Ethers of β-Cyclodextrin

| Example | propylene oxide | % NaOH$^a$ | $k_2:k_3:k_6$ | Average Degree of substitution | |
|---|---|---|---|---|---|
| | | | | From mole % of ethers | From m.s. |
| 1 | (RS) | 16.9 | 1:0.43:2.1 | 1.7 | 2.5 |
| 2 | (RS) | 17.5 | 1:0.40:1.6 | 5.3 | 6.8 |
| 3 | (RS) | 5.7 | 1:0.15:0.12 | 5.8 | 6.6 |
| 4 | (S) | 1.5 | 1:0.36:0.08 | 2.0 | 3.4 |
| 5 | (S) | 4.8 | 1:0.27:0.32 | 5.5 | 6.0 |
| 6 | (S) | 17.0 | 1:0.28:2.2 | 5.2 | 5.8 |

TABLE 1

Summary of Preparative Conditions of Hydroxypropyl-β-cyclodextrins

| | Examples | | | | | | |
|---|---|---|---|---|---|---|---|
| | 1 | 2 | 3 | 4 | 5 | 6 | 7 |
| sodium hydroxide solution used as a solvent (% W/W) | 16.9% | 17.5% | 5.7% | 1.5% | 4.8% | 17% | 30% |
| final reaction mixture (% W/W) | | | | | | | |
| sodium hydroxide | 10.4% | 10.5% | 2.9% | 1.1% | 2.7% | 10.3% | 23.4% |
| cyclodextrin (anhydrous) | 29.6% | 21.3% | 28.6% | 15.1% | 23.0% | 21.3% | 11.6% |
| propylene oxide | 4.0% | 15.4% | 14.4% | 10.9% | 16.6% | 15.4% | 8.4% |
| final reaction mixture (molar ratio) | | | | | | | |
| sodium hydroxide/ cyclodextrin | 10.0 | 13.9 | 2.9 | 2.1 | 3.4 | 13.8 | 57.2 |
| propylene oxide/ cyclodextrin | 2.6 | 14.1 | 9.8 | 14.3 | 14.3 | 14.3 | 14.1 |

TABLE 3-continued

Relative Reactivities at the 2,3- and 6-Positions and Average Degree of Substitution Values for the Different 2-Hydroxypropyl Ethers of β-Cyclodextrin

| Example | propylene oxide | % NaOH[a] | k₂:k₃:k₆ | Average Degree of substitution From mole % of ethers | From m.s. |
|---|---|---|---|---|---|
| 7 | (S) | 30 | 1:0.41:7.6 | 4.0 | 5.2 |
| 8 | (S) | [b] | 1:0.17:8.3 | 3.0 | — |

[a]Concentration of aqueous sodium hydroxide solution (W/W) used as a solvent for the other reaction components.
[b]Sodium methylsulfinylmethide in dimethyl sulfoxide.

What is claimed is:

1. A method for directing the substitution of hydroxyalkyl groups on cyclodextrins which comprises employing an alkali concentration in a reaction of an epoxide with a cyclodextrin so as to direct the substitution either to the primary hydroxyls or the secondary hydroxyls of the cyclodextrin molecule.

2. A method according to claim 1, wherein the hydroxyalkyl substitution is directed toward the narrow opening of the cavity of the cyclodextrin molecule.

3. A method according the claim 1, wherein the hydroxyalkyl substitution is directed toward the wide opening of the cavity of the cyclodextrin molecule.

4. A method according to claim 1, wherein the alkali is sodium hydroxide.

5. A method according to claim 4, wherein the concentration of sodium hydroxide in the reaction mixture is lower than 2.7% (W/W).

6. A method according to claim 4, wherein the concentration of sodium hydroxide in the reaction mixture is higher than 10.3% (W/W).

7. A method according to claim 4, wherein the molar ratio of sodium hydroxide to cyclodextrin in the final reaction mixture is lower than 3.4.

8. A method according to claim 4, wherein the molar ratio of sodium hydroxide to cyclodextrin in the final reaction mixture is higher than 13.8.

9. A method according to claim 1, wherein the epoxide is propylene oxide.

10. A method according to claim 4, wherein the epoxide is propylene oxide.

11. A method according to claim 5, wherein the epoxide is propylene oxide.

12. A method according to claim 7, wherein the epoxide is propylene oxide.

13. A method according to claim 1, wherein mixtures of hydroxyalkylcyclodextrins are obtained which vary slightly in their average degree of substitution, but in which the pattern of substitution is substantially changed.

14. A method according to claim 1, wherein fully alkylated derivatives of said cyclodextrins are obtained.

15. A method for directing the substitution of hydroxypropyl groups on cyclodextrins which comprises reacting propylene oxide and a cyclodextrin in the presence of sodium hydroxide having a concentration of lower than 2.9% (W/W) or a concentration of higher than 10.3% (W/W), whereby the substitution is directed either to the primary hydroxyls or the secondary hydroxyls of the cyclodextrin molecule.

16. A method according to claim 15, wherein the hydroxypropyl substitution is directed toward the narrow opening of the cavity of the cyclodextrin molecule.

17. A method according to claim 15, wherein the hydroxypropyl substitution is directed toward the wide opening of the cavity of the cyclodextrin molecule.

* * * * *